(12) United States Patent
Nagahara et al.

(10) Patent No.: US 8,067,124 B2
(45) Date of Patent: Nov. 29, 2011

(54) FUEL CELL SYSTEM

(75) Inventors: Yoshiki Nagahara, Yokohama (JP); Ryoichi Shimoi, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 538 days.

(21) Appl. No.: 12/305,289

(22) PCT Filed: Sep. 18, 2007

(86) PCT No.: PCT/IB2007/002708
§ 371 (c)(1), (2), (4) Date: Dec. 17, 2008

(87) PCT Pub. No.: WO2008/035175
PCT Pub. Date: Mar. 27, 2008

(65) Prior Publication Data
US 2009/0130508 A1    May 21, 2009

(30) Foreign Application Priority Data
Sep. 20, 2006    (JP) .................................. 2006-254052

(51) Int. Cl.
*H01M 8/04*    (2006.01)
(52) U.S. Cl. ....................................... 429/432; 429/442

(58) Field of Classification Search ................... 429/410, 429/432, 442, 444, 450, 465
See application file for complete search history.

(56) References Cited

U.S. PATENT DOCUMENTS

| | | | |
|---|---|---|---|
| 5,213,912 A | 5/1993 | Kunz et al. | 429/410 |
| 2004/0247510 A1 | 12/2004 | Grasso et al. | 429/243.01 |
| 2005/0272595 A1* | 12/2005 | Kobayashi et al. | 502/101 |
| 2006/0154119 A1* | 7/2006 | Kumar et al. | 429/13 |

FOREIGN PATENT DOCUMENTS

| | | |
|---|---|---|
| EP | 1 699 103 | 9/2006 |
| JP | 3475869 | 9/2003 |
| WO | WO 03/083975 | 10/2003 |
| WO | WO 2004/030119 | 4/2004 |
| WO | WO 2005/071785 | 8/2005 |

* cited by examiner

*Primary Examiner* — Javaid Nasri
(74) *Attorney, Agent, or Firm* — Drinker Biddle & Reath LLP

(57) ABSTRACT

A fuel cell system for removing sulfur compounds adsorbed on the surfaces of a catalyst. The fuel cell system includes a fuel cell in which a plurality of unit cells, each having an electrolyte membrane held between electrode catalyst layers, are stacked, and a control device for recovering catalytic activity of the electrode catalyst layers by increasing an amount of water discharged from the electrode catalyst layers to a predetermined amount or more.

18 Claims, 5 Drawing Sheets

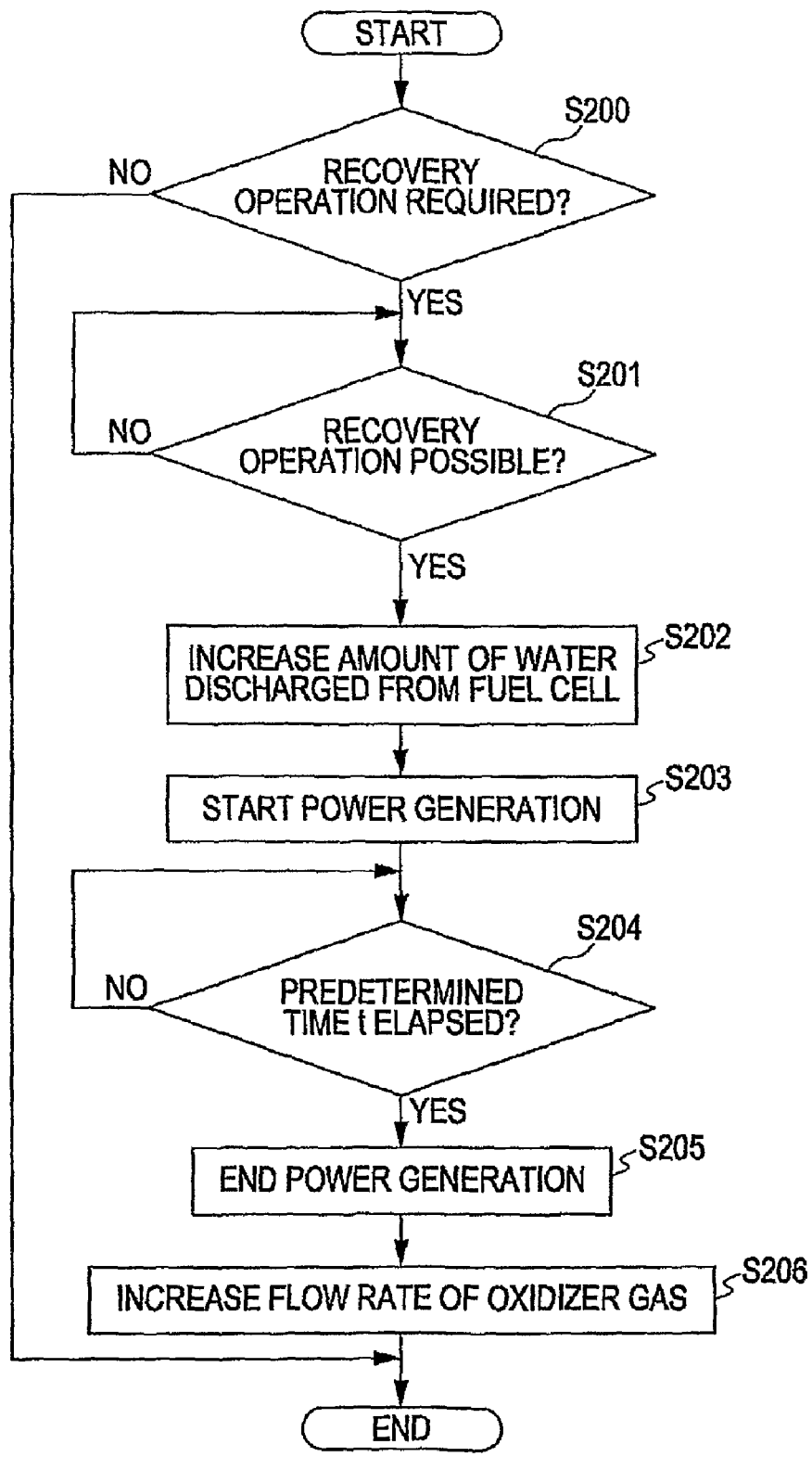

FUEL CELL SYSTEM

CROSS-REFERENCE TO RELATED APPLICATIONS

This application claims priority to Japanese Patent Application No. 2006-254052, filed Sep. 20, 2006, the disclosure of which is incorporated by reference herein in its entirety.

BACKGROUND OF THE INVENTION

1. Field of the Invention

The present invention relates to a fuel cell system and in particular to a fuel cell system using a solid polymer membrane as an electrolyte membrane.

2. Description of the Related Art

In a general fuel cell system, after power general performance is decreased due to impurities in a fuel cell, the polarities of the fuel cell are reversed to draw out a current and to move and discharge impurity ions from an electrolyte membrane (refer to, for example, Japanese patent No. 3475869).

SUMMARY OF THE INVENTION

However, in such a general fuel cell system, impurities adsorbed on the surfaces of a catalyst cannot be removed.

The present invention has been achieved in consideration of the above-mentioned problem, and it is an object of the present invention to remove impurities such as atmospheric sulfur compounds.

In accordance with an embodiment of the present invention, a fuel cell system includes a fuel cell in which a plurality of unit cells, each having an electrolyte membrane held between electrode catalyst layers, are stacked, and a control device for recovering the catalytic activity of the electrode catalyst layers by increasing the amount of water discharged from the electrode catalyst layers to a predetermined amount or more.

In the fuel cell system, the amount of water discharged from the electrode catalyst layers is increased to a predetermined amount or more so that sulfur compounds adsorbed on the catalyst surfaces can be removed.

BRIEF DESCRIPTION OF THE DRAWINGS

FIG. 6 is a flowchart showing the procedures for an operation of recovering catalytic activity in a fuel cell system according to a third embodiment.

DESCRIPTION OF THE PREFERRED EMBODIMENTS

First Embodiment

A fuel cell system according to a first embodiment of the present invention will be described with reference to FIG. 1.

Figure 1:
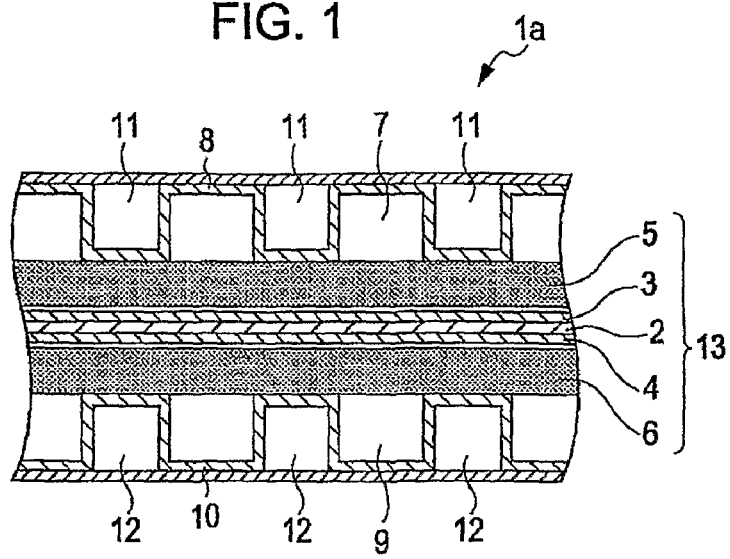
FIG. 1 is a partial longitudinal sectional view showing a reaction portion of a unit cell of a fuel cell in a fuel cell system according to a first embodiment of the present invention.

FIG. 1 is a partial longitudinal sectional view showing a reaction portion of a unit cell 1a of a fuel cell 1 in the fuel cell system according to the first embodiment. The fuel cell 1 illustrated in FIG. 3 has a stacked structure in which 100 to 200 unit cells 1a are stacked. FIG. 1 is a sectional view taken along line I-I in FIG. 2.

The unit cell 1a includes a solid polymer electrolyte membrane 2 (hereinafter referred to as an "electrolyte membrane"), an anode catalyst layer 3 (e.g. electrode catalyst layer or fuel pole) and a cathode catalyst layer 4 (e.g. electrode catalyst layer or oxidizer layer) which hold the electrolyte membrane 2 therebetween, an anode gas diffusion layer 5 provided on the outside of the anode catalyst layer 3, and a cathode gas diffusion layer 6 provided on the outside of the cathode catalyst layer 4. Also, the unit cell 1a includes an anode separator 8 provided on the anode gas diffusion layer-side surface and having a plurality of hydrogen passages 7 (i.e. fuel gas passages) and a cathode separator 10 provided on the cathode gas diffusion layer-side surface and having a plurality of air passages 9 (i.e. oxidizer gas passages). Further, the anode separator 8 and the cathode separator 10 include cooling water passages 11 and 12 which are provided between the adjacent hydrogen passages 7 and between the adjacent air passages 9, respectively. The hydrogen passages 7 and the air passages 9 are partitioned by the cooling water passages 11 and 12, respectively. For example, the plurality of air passages 9 is arranged from the air inlet manifold side to the air exhaust manifold side and partitioned in parallel with each other, as shown in FIG. 2.

In the first embodiment, the electrolyte membrane 2, the anode catalyst layer 3, the cathode catalyst layer 4, the anode gas diffusion layer 5, and the cathode gas diffusion layer 6 constitute a membrane electrode assembly (MEA) 13.

Each of the anode catalyst layer 3 and the cathode catalyst layer 4 is formed by supporting a catalyst such as platinum on carbon black or the like. Each of the anode gas diffusion layer 5 and the cathode gas diffusion layer 6 is made of a conductive porous material, e.g., carbon paper or carbon cloth. In the first embodiment, each of the anode separator 8 and the cathode separator 10 is composed of carbon, but each of the anode separator 8 and the cathode separator 10 may be composed of a metal plated with a noble metal.

Figure 2:
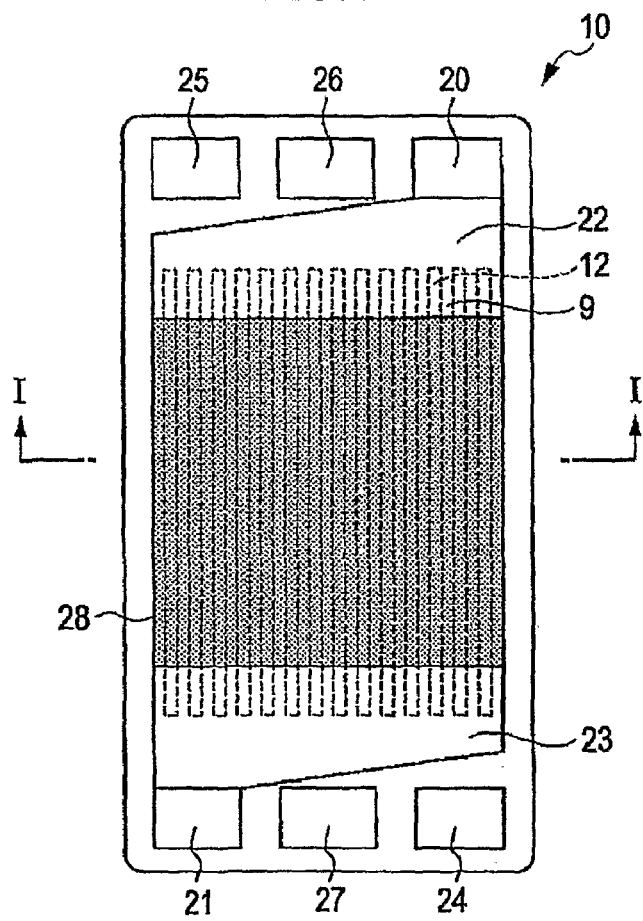
FIG. 2 is a front view of a cathode separator constituting a unit cell as viewed from the electrolyte membrane side.

FIG. 2 is a front view of the cathode separator 10 constituting the unit cell 1a as viewed from the electrolyte membrane 2 side. In FIG. 2, a reaction portion 28 in which fuel gas reacts with oxidizer gas in the membrane electrode assembly 13 is shown by shading. In the embodiment, the cathode separator 10 is a carbon separator.

When hydrogen and air are supplied as fuel gas and oxidizer gas, respectively, to the fuel cell, the following electrochemical reactions take place:

Fuel pole: $2H_2 \rightarrow 4H^+ + 4e$  equation (1)

Oxidizer pole: $O_2 + 4H^+ + 4e \rightarrow 2H_2O$ 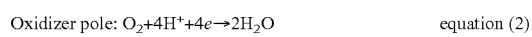 equation (2)

The air supplied as the oxidizer gas to the fuel cell from the outside contains air pollutants such as sulfur oxides, hydrogen sulfide, and nitrogen oxides. Among these pollutants, sulfur compounds strongly adsorb on the surfaces of the catalyst on the oxidizer pole to inhibit the reaction in equation 2 taking place on the electrode surface and decrease the power generation performance of the fuel cell.

The cathode separator 10 includes the air passages 9 in each of which air (i.e. oxidizer gas) flows on the surface facing the membrane electrode assembly 13, the air inlet manifold 20 (i.e. oxidizer gas inlet) for supplying air to the air passages 9, and the air exhaust manifold 21 (i.e. oxidizer gas outlet) for discharging air unreacted in the reaction portion 28 from the air passages 9. The air passages 9 are connected to the air inlet manifold 20 through a diffuser 22, and connected to the air exhaust manifold 21 through a diffuser 23.

Also, the cathode separator 10 includes a hydrogen inlet manifold 24 (i.e. fuel gas inlet) for introducing hydrogen (i.e. fuel gas) into the hydrogen passages 7 provided in the anode separator 8, and a hydrogen exhaust manifold 25 (i.e. fuel gas outlet) for discharging hydrogen unreacted in the reaction portion 28 from the hydrogen passages 7. Further, the cathode separator 10 includes a cooling water inlet manifold 26 for introducing cooling water into the cooling water passages 11 and 12 and a cooling water exhaust manifold 27 for discharging the cooling water from the cooling water passages 11 and 12.

The anode separator 8 has a shape which is right-left and front-back reverse to that of the cathode separator 10 shown in FIG. 2. The hydrogen inlet manifold 24 is connected to the reaction portion 28 through a diffuser (not shown in the drawing), and the reaction portion 28 is connected to the hydrogen exhaust manifold 25 through a diffuser (not shown in the drawing). Therefore, the unit cell 1*a* according to the first embodiment is a so-called counterflow type in which the fuel gas and the oxidizer gas flow in opposite directions.

Although, in the embodiment, the unit cell 1*a* is a counterflow type, it may be a parallel-flow type in which the fuel gas and the oxidizer gas flow in the same direction.

Figure 3:
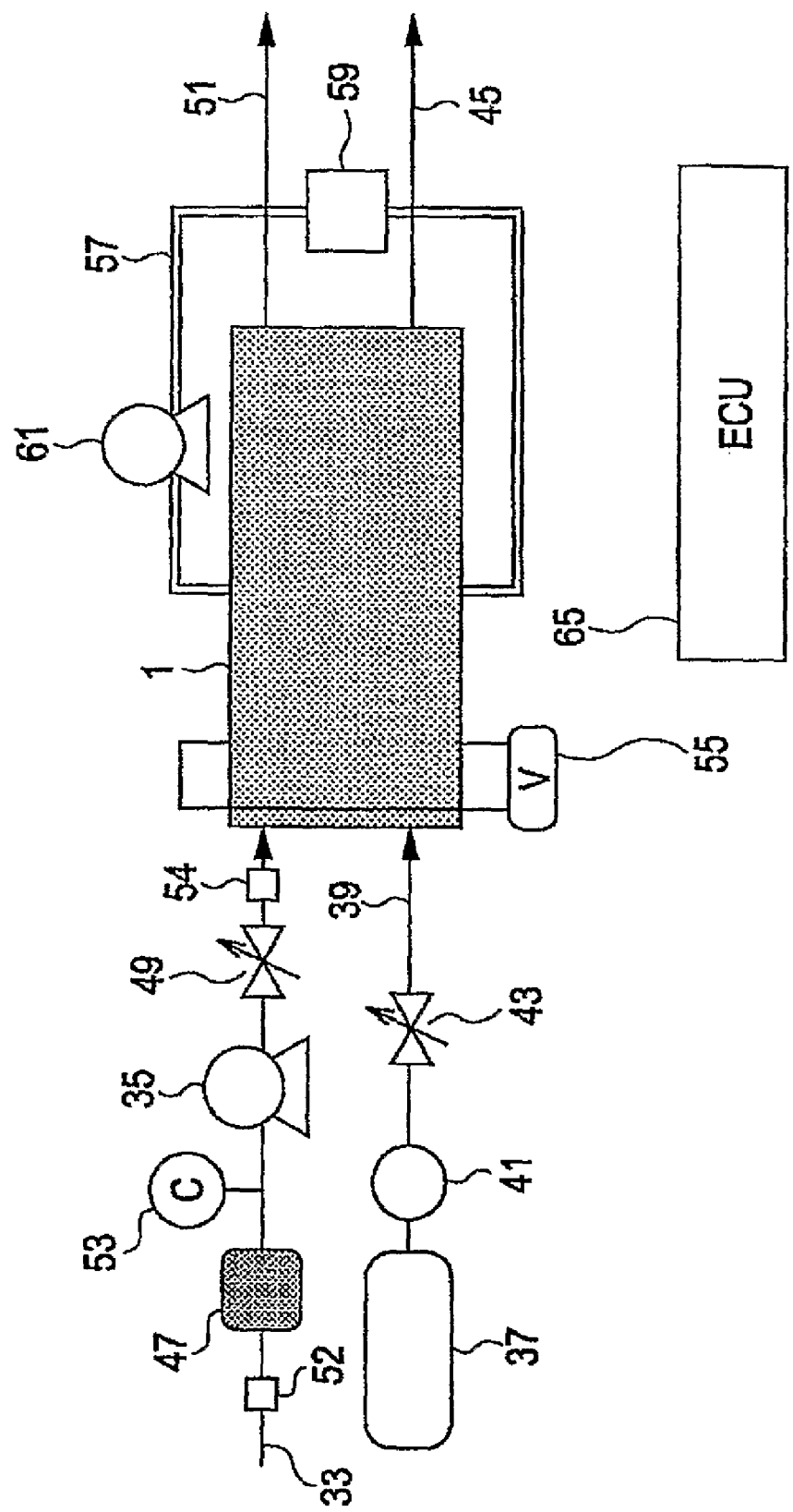
FIG. 3 is a view showing an example of the fuel cell system according to the first embodiment.

FIG. 3 is a drawing showing an example of the fuel cell system according to the first embodiment. The fuel cell system includes the fuel cell 1 having a stacked structure in which a plurality of the unit cells 1*a*, shown in FIGS. 1 and 2, are stacked; an oxidizer gas supply pipe 33 for supplying the oxidizer gas, such as air, to each cathode catalyst layer 4 of the fuel cell 1; an oxidizer gas blower 35 provided on the oxidizer gas supply pipe 33, for sending the oxidizer gas to the fuel cell 1; and a fuel gas tank 37 for storing the fuel gas, such as hydrogen, to be supplied to the fuel cell. The fuel gas tank 37 is, for example, a high-pressure tank in which hydrogen is stored under a high pressure.

The fuel gas, such as hydrogen, is supplied to each anode catalyst layer 3 of the fuel cell 1 through a fuel gas supply pipe 39. Namely, the fuel gas is supplied to the anode catalyst layers 3 of the unit cells 1*a* of the fuel cell 1 through the fuel gas supply pipe 39, and the oxidizer gas is supplied to the cathode catalyst layers 4 through the oxidizer gas supply pipe 33. The fuel gas and the oxidizer gas react in the electrolyte membrane 2 to generate electric power.

The fuel gas stored in the fuel gas tank 37 is supplied to the fuel cell 1 through a fuel gas regulating valve 41 and a fuel gas supply regulating valve 43 which are provided on the fuel gas supply pipe 39. The fuel cell 1 is also provided with a fuel gas exhaust pipe 45 for discharging the fuel gas unreacted in the fuel cell 1.

The oxidizer gas is, for example, air and supplied to the fuel cell 1 through an oxidizer gas filter 47, the oxidizer gas blower 35, and an oxidizer gas supply regulating valve 49 which are provided on the oxidizer gas supply pipe 33. In the embodiment, the oxidizer gas filter 47 is provided upstream of the oxidizer gas blower 35, and the oxidizer gas supply regulating valve 49 is provided downstream of the oxidizer gas blower 35. The oxidizer gas filter 47 has the function to remove impurities in the air to be supplied to the fuel cell 1.

The oxidizer gas from which impurities have been removed by the oxidizer gas filter 47 is sent to the cathode catalyst layers 4 of the fuel cell 1 by the oxidizer gas blower 35. The oxidizer gas unreacted in the fuel cell 1 (e.g., nitrogen gas) is discharged from the fuel cell 1 through an oxidizer gas exhaust pipe 51 connected to the fuel cell 1.

The fuel cell system according to the embodiment further includes a sulfur compound sensor 53 (e.g. sulfur compound detector) provided between the oxidizer gas filter 47 and the oxidizer gas blower 35, for detecting the concentration of the sulfur compounds contained in the oxidizer gas flowing through the oxidizer gas supply pipe 33. The sulfur compound sensor 53 detects the concentration of the sulfur compound contained in the oxidizer gas after passage through the oxidizer gas filter 47. Although, in this embodiment, the sulfur compound sensor 53 is provided between the oxidizer gas filter 47 and the oxidizer gas blower 35, the sulfur compound sensor 53 may be provided at another position of the oxidizer gas supply pipe 33.

Further, an oxidizer gas flow rate sensor 52 (e.g. oxidizer gas flow rate detector) for detecting the flow rate of the oxidizer gas flowing through the oxidizer gas supply pipe 33, and an oxidizer gas humidifier 54 (e.g. oxidizer gas humidifying device) for increasing the water content of the oxidizer gas to be supplied to the fuel cell 1. In the embodiment, the oxidizer gas flow rate sensor 52 is provided upstream of the oxidizer gas filter 47, and the oxidizer gas humidifier 54 is provided downstream of the oxidizer gas supply regulating valve 49. Although, in the embodiment, the oxidizer gas flow rate sensor 52 is provided upstream of the oxidizer gas filter 47, the installation position is not so limited, as long as it is provided on the oxidizer gas supply pipe 33.

The fuel gas supplied to the fuel gas supply pipe 39 from the fuel gas tank 37 is reduced in pressure by the fuel gas regulating valve 41 provided on the fuel gas supply pipe 39, and the flow rate of the fuel gas is controlled by the fuel gas supply regulating valve 43.

Further, a unit cell voltage sensor 55 (e.g. unit cell voltage detector) is provided between the anode catalyst layer 3 and the cathode catalyst layer 4 of each unit cell 1*a* of the fuel cell 1, for detecting the voltage of each unit cell 1*a*.

The fuel cell 1 according to the embodiment further includes a cooling water line 57, a cooling water tank 59 for storing the cooling water, and a cooling water pump 61 for circulating the cooling water.

The fuel cell system according to the first embodiment further includes an ECU 65 (i.e. electric control unit) so that the fuel cell 1, the oxidizer blower 35, the fuel gas supply regulating valve 43, and the cooling water pump 61 are controlled by the ECU 65. For example, the ECU 65 controls the power generation load (i.e. electric power) of the fuel cell 1. The oxidizer blower 35 is controlled by the ECU 65 so that the flow rate of the oxidizer gas to be supplied to the fuel cell 1 is controlled. The cooling water pump 61 is controlled by the ECU 65 to control the flow rate of the cooling water to be supplied to the fuel cell 1. Although not shown in FIG. 3, the fuel cell 1, the oxidizer blower 35, the fuel gas supply regulating valve 43, and the cooling water pump 61 are electrically connected to the ECU 65.

The ECU 65 is electrically connected to the oxidizer gas flow rate sensor 52, the sulfur compound sensor 53, the oxidizer gas humidifier 54, and the unit cell voltage sensor 55. Therefore, the flow rate of the oxidizer gas flowing through the oxidizer gas supply pipe 33, the concentration of the sulfur compounds contained in the oxidizer gas flowing through the oxidizer gas supply pipe 33, reading of the voltage of each unit cell 1*a*, and the water content of the oxidizer gas to be supplied to the fuel cell 1 are controlled.

In the fuel cell system according to the embodiment, when the concentration of the sulfur compounds contained in the oxidizer gas flowing through the oxidizer gas supply pipe 33 is a predetermined value or more, or when the voltage drop of each unit cell 1a is a predetermined value or more, the ECU 65 controls the oxidizer gas humidifier 54 to increase the water content of the oxidizer gas to be supplied to the fuel cell 1 and produce power generation in the fuel cell 1 with a predetermined load or more. As a result, the amount of water discharged from the catalyst layers of the fuel cell 1 is increased to a predetermined value or more. At this time, the ECU 65 controls the power generation load of the fuel cell 1 so that the amount of water discharged from the catalyst layers is increased to a value larger than that in an ordinary operation of the fuel cell 1. Therefore, power generation takes place in the fuel cell 1 under a high-humidity condition, and thus the amount of water discharged from the catalyst layers of the fuel cell 1 is increased, thereby removing impurities such as the sulfur compounds adsorbed on the catalyst surfaces. In the embodiment, the ECU 65, the oxidizer gas humidifier 54, and the sulfur compound sensor 53 function as a catalytic activity recovering device for recovering the catalytic activity of the catalyst in the cathode catalyst layers 4.

Figure 4:
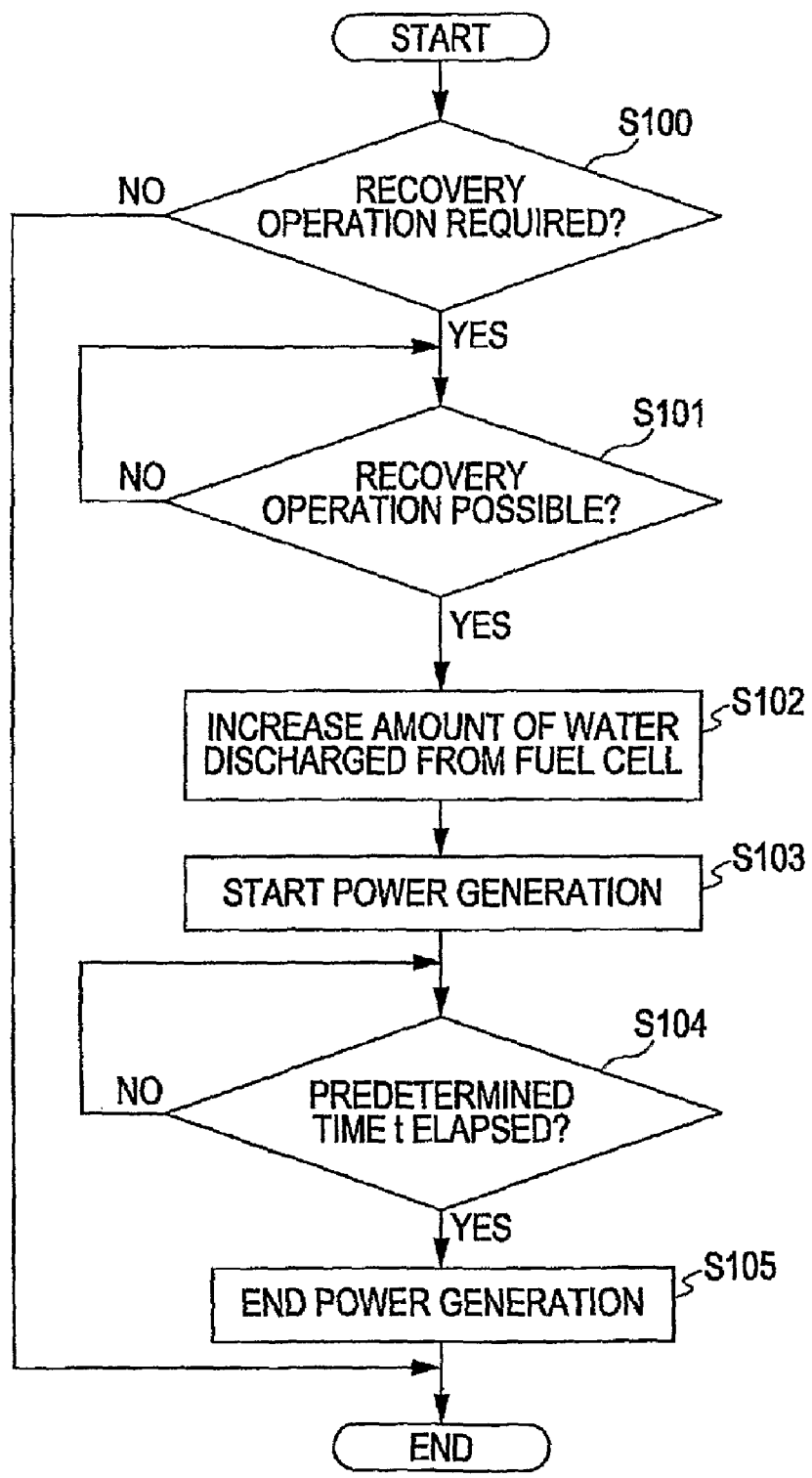
FIG. 4 is a flowchart showing the procedures for an operation of recovering catalytic activity in the fuel cell system according to the first embodiment.

FIG. 4 is a flowchart showing the procedures for an operation of recovering the catalytic activity in the fuel cell system according to the first embodiment. The operation of recovering the catalytic activity shown in FIG. 4 is performed in the fuel cell system shown in FIG. 1.

When the fuel cell system is driven to start treatment, the ECU 65 decides whether or not the operation of recovering the catalytic activity is required (Step 100). In this step, the sulfur compound sensor 53 and the unit cell voltage sensor 55 function as a fuel cell condition detector for detecting the condition of the fuel cell 1. The ECU 65 functions as a recovery operation necessity deciding device for deciding whether or not the operation of recovering the catalytic activity is required on the basis of the detection signal from the fuel cell condition detector.

In Step 100, when the conditions described below are satisfied, the ECU 65 decides that the operation of recovering the catalytic activity of the fuel cell 1 is required.

As the first condition, for example, when the concentration of the sulfur compounds detected by the sulfur compound sensor 53 is a predetermined value or more, the ECU 65 decides that the operation of recovering the catalytic activity is required and controls to perform the operation of recovering the catalytic activity. The sulfur compound sensor 53 detects the concentration of the sulfur compounds contained in the oxidizer gas which flows through the oxidizer gas supply pipe 33 and is supplied to the fuel cell 1, and the ECU 65 reads the detection signal. In performing the operation of recovering the catalytic activity, the predetermined concentration of the sulfur compounds can be determined by, for example, experimentally measuring the concentration of the sulfur compounds at which the power generation performance of the fuel cell 1 is decreased by a predetermined degree or more. In an experimental method, for example, hydrogen gas and air are supplied as the fuel gas and the oxidizer gas to the fuel pole and the oxidizer pole, respectively, in a fuel cell unit cell, to generate electric power, and a change in the cell voltage when a predetermined concentration of sulfur compounds is mixed in the oxidizer gas is measured. As a result, it is possible to obtain a relation between the sulfur compound concentration in the supplied gas and decrease in power generation performance of the fuel cell. The sulfur compound sensor 53 is not necessarily provided on the oxidizer gas supply pipe 33. For example, when the fuel cell system according to the embodiment is mounted on an automobile car including a navigation system, the sulfur compound concentration information read by the car navigation system in a traveling area may be read by the ECU 65.

As the second condition, for example, when the cumulative amount of the sulfur compounds contained in the oxidizer gas flowing into the fuel cell 1 within a predetermined time is a predetermined value or more, the ECU 65 decides that the operation of recovering the catalytic activity is required and controls to perform the operation of recovering the catalytic activity. As a method for calculating the cumulative amount of the sulfur compounds flowing into the fuel cell 1 within a predetermined time, a method can be used, in which the flow rate of the oxidizer gas detected by the oxidizer gas flow rate sensor 52, the concentration of the sulfur compounds contained in the oxidizer gas detected by the sulfur compound sensor 53, and the inflow time of the sulfur compounds are integrated. In this case, the ECU 65, the oxidizer gas flow rate sensor 52, and the sulfur compound sensor 53 function as a sulfur compound cumulative supply detector for detecting the cumulative amount of the sulfur compounds flowing into the fuel cell 1. In performing the operation of recovering the catalytic activity, a predetermined amount of the sulfur compound cumulative inflow can be determined by, for example, experimentally measuring the cumulative inflow of the sulfur compounds until the power generation performance of the fuel cell 1 is decreased by a predetermined degree or more. In an experimental method, for example, hydrogen gas and air are supplied as the fuel gas and the oxidizer gas to the fuel pole and the oxidizer pole, respectively, in a fuel cell unit cell to generate electric power, and a change in the cell voltage when a predetermined concentration of sulfur compounds is mixed in the oxidizer gas is measured. As a result, it is possible to obtain a relation between the cumulative inflow of the sulfur compounds supplied to the fuel cell and decrease in power generation performance of the fuel cell.

As the third condition, for example, when the voltage drop of the unit cell 1a detected by the unit cell voltage sensor 55 is a predetermined value or more, the ECU 65 decides that the operation of recovering the catalytic activity is required and controls to perform the operation of recovering the catalytic activity. The voltage drop of the unit cell 1a represents the voltage drop per unit cell 1a, for example, when the fuel cell 1 generates electric power with a predetermined load. In performing the operation of recovering the catalytic activity, the voltage drop of the unit cell 1a can be determined, for example, on the basis of the characteristics of the fuel cell 1.

As the fourth condition, for example, when the rate of voltage drop of the unit cell 1a of the fuel cell 1 is a predetermined value or more, the ECU 65 decides that the operation of recovering the catalytic activity is required and controls to perform the operation of recovering the catalytic activity. The rate of voltage drop of the unit cell 1a represents the voltage drop (i.e. voltage gradient) per unit cell 1a within a predetermined time, for example, when the fuel cell 1 is driven with a predetermined load. In the embodiment, the rate of voltage drop of the unit cell 1a is determined by the ECU 65 from a voltage change of the unit cell 1a detected by the unit cell voltage sensor 55. The unit cell voltage sensor 55 and the ECU 65 function as a unit cell voltage drop rate detector for detecting the voltage drop rate of the unit cell 1a. In performing the operation of recovering the catalytic activity, the rate of voltage drop of the unit cell 1a can be experimentally determined on the basis of the materials of the cathode catalyst layers 4 and the electrolyte membranes 2, and the characteristics of the fuel cell 1.

The fifth condition, for example, when the cumulative operation time of the fuel cell 1 is a predetermined value or more, the ECU 65 decides that the operation of recovering the catalytic activity is required and controls to perform the operation of recovering the catalytic activity. The ECU 65 calculates the cumulative operation time of the fuel cell 1 using a timer (not shown) provided therein. In performing the operation of recovering the catalytic activity, the cumulative operation time of the fuel cell 1 depends on the concentration of the sulfur compounds in the operation environment of the fuel cell system and the impurity capture performance of the oxidizer gas filer 47. For example, the cumulative operation time can be set to about 50 hours on the basis of the general environmental standard concentration.

Although any one of the above-mentioned five conditions for the operation of recovering the catalytic activity of the fuel cell 1 may be selected, the operation of recovering the catalytic activity may be performed under a plurality of the conditions.

Returning to the flowchart of FIG. 4, when it is decided in Step 100 that the operation of recovering the catalytic activity is not required, the treatment is finished.

In Step 100, when it is decided on the basis of any of the five conditions that the operation of recovering the catalytic activity is required, the ECU 65 decides whether or not the operation of recovering the catalytic activity is possible in the fuel cell 1 (Step 101). At the same time, the ECU 65 functions as a recovery operation possibility deciding device for deciding whether or not the operation of recovering activity is possible. In Step 101, the ECU 65 decides whether or not the fuel cell 1 performs a high-load operation sufficient to increase the amount of water discharged from the catalyst layers of the fuel cell 1 to a predetermined value or more. For example, when the fuel cell system according to the first embodiment is mounted on an automobile car, this operation corresponds to traveling of the automobile car on an expressway. In this state, the operation of recovering the catalytic activity can be executed for the catalyst under a high wet condition, and thus the catalytic activity can be more effectively recovered. In such a case, surplus power occurs, and thus the surplus power can be charged in a battery (not shown) such as a secondary battery.

In Step 101, when it is decided that the fuel cell 1 is under the condition in which the operation of recovering the catalytic activity is not possible, Step 101 is repeated until the operation of recovering the catalytic activity is made possible (i.e. until the fuel cell 1 performs a high-load operation sufficient to increase the amount of water discharged from the catalyst layers of the fuel cell 1 to a predetermined value or more).

In Step 101, when it is decided that the fuel cell 1 is under the condition in which the operation of recovering the catalytic activity is possible, the operation of recovering the catalytic activity, i.e., a treatment for increasing the amount of water discharged from the catalyst layers of the fuel cell 1 to a predetermined value or more, is performed (Step 102). In this step, it is possible to use a method other than the above-described method in which the ECU 65 controls the oxidizer gas humidifier 54 to increase the water content of the oxidizer gas to be supplied to the fuel cell 1 and generate electric power in the fuel cell 1 at a predetermined load or more. For example, the ECU 65 can control the cooling water pump 61 to increase the flow rate of the cooling water to be supplied to the fuel cell 1 and decrease the temperature of the fuel cell 1, thereby increasing the amount of water discharged from the catalyst layers of the fuel cell 1. As a result, the relative humidity in the fuel cell 1 is increased to increase the amount of water discharged from the catalyst layers of the fuel cell 1. In Step 102, the amount of water discharged from the catalyst layers of the fuel cell 1 is increased to a predetermined value or more, but the predetermined amount of water discharged is, for example, an amount sufficient to desorb and remove impurities such as the sulfur compounds adsorbed on the catalyst of the cathode catalyst layers 4. Since a proper amount changes depending on the concentration of the sulfur compounds detected by the sulfur compound sensor 52 and the cumulative flow rate of the sulfur compounds detected by the sulfur compound cumulative supply detector, the predetermined amount is preferably set to a value determined on the basis of an experiment.

After, the amount of water discharged from the catalyst layers of the fuel cell 1 is increased to a predetermined value or more, the ECU 65 increases the power generation load so that the amount of water discharged from the catalyst layers of the fuel cell 1 is an amount sufficient to desorb and remove impurities such as the sulfur compounds adsorbed on the catalyst, thereby starting power generation in the fuel cell 1 (Step 103).

Then, the ECU 65 decides whether or not a predetermined time t has elapsed (Step 104). When it is decided that the predetermined time t has elapsed from the start of power generation due to an increase in power generation load of the fuel cell 1, the power generation of the fuel cell 1 is finished (Step 105). In Step 105, the power generation load of the fuel cell 1 is returned to a normal value or the power generation is finished to finish the operation of recovering the catalytic activity. When it is decided in Step 104 that the predetermined time t has not elapsed from the start of power generation due to an increase in power generation load, the power generation is continued under this condition until the predetermined time t elapses.

In Steps 103 and 104, power generation is performed for the predetermined time t by increasing the power generation load of the fuel cell, and thus the amount of water discharged from the cathode catalyst layers 4 is increased. The water flows to the outside from the fuel cell 1 through the fuel gas exhaust pipe 45, thereby promoting desorption and removal of impurities such as the sulfur compounds adsorbed on the catalyst of the cathode catalyst layers 4. Appropriate values of the predetermined time t of power generation due to an increase in power generation load and the power generation load change depending on the material of the catalyst of the cathode catalyst layers 4, the moisture state of the cathode catalyst layers 4, the concentration of the sulfur compounds detected by the sulfur compound sensor 52, or the cumulative flow rate of the sulfur compounds detected by the sulfur compound cumulative supply detector. Therefore, the predetermined time t is preferably set to a value determined on the basis of an experiment. In the embodiment, for example, the predetermined time can be set to about 30 minutes.

In the first embodiment, the sulfur compounds adsorbed on the surfaces of the catalyst can be removed by increasing the amount of water discharged from the cathode catalyst layers 4 of the fuel cell 1 to the predetermined value or more. Therefore, it is possible to prevent deterioration of the catalyst (particularly, the catalyst of the cathode catalyst layers 4) and suppress a decrease in power generation performance of the fuel cell 1.

Second Embodiment

Figure 5:
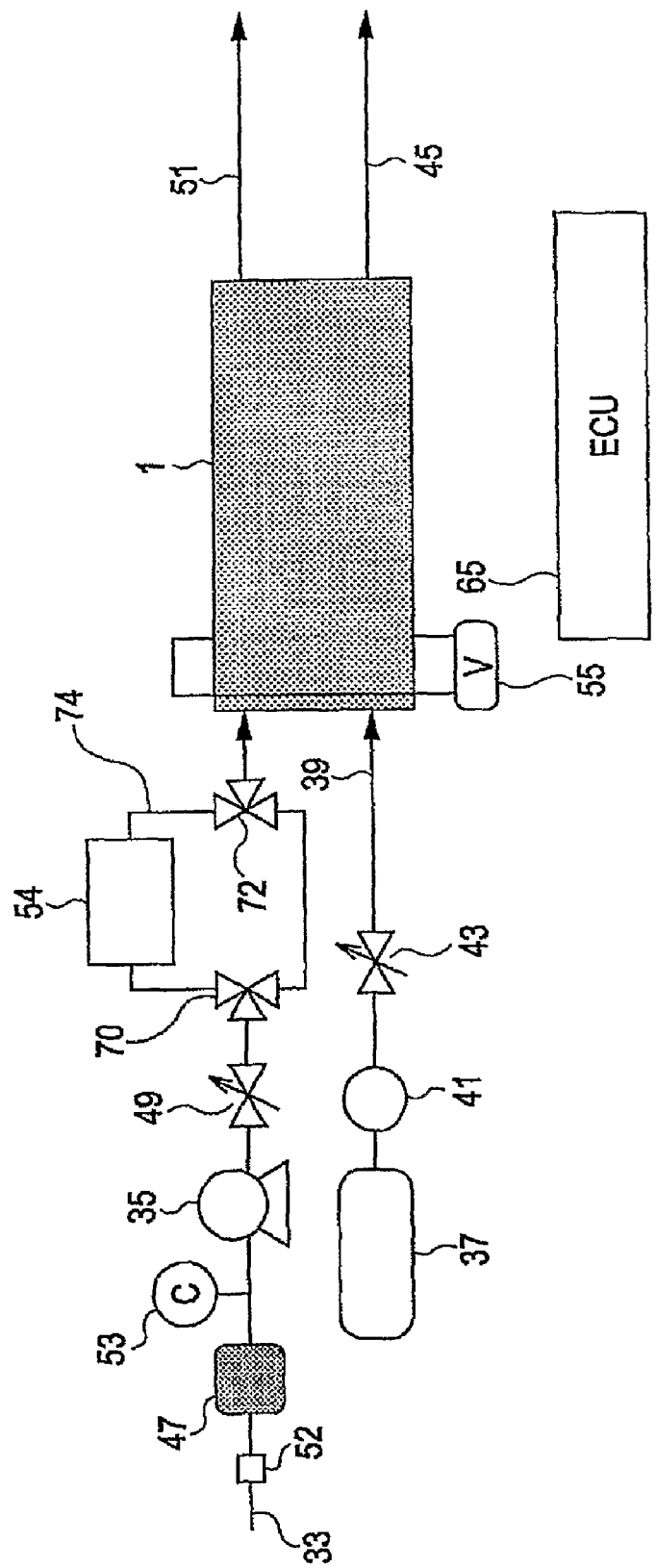
FIG. 5 is a view showing an example of a fuel cell system according to a second embodiment.

FIG. 5 is a view showing an example of a fuel cell system according to a second embodiment. The fuel cell system according to the second embodiment is the same as the fuel cell system according to the first embodiment with the exception of the points described below. The same components are denoted by the same reference numerals. In FIG. 5, the cooling water line 57, the cooling water tank 59, and the cooling water pump 61 are omitted.

The fuel cell system according to the second embodiment includes two three-way valves 70 and 72 provided downstream of the oxidizer gas supply regulating valve 49 of the oxidizer gas supply pipe 33. The oxidizer gas supply pipe 33 is branched into two passages by the three-way valves 70 and 72, and the oxidizer gas humidifier 54 is provided on one of the passages, i.e., an oxidizer gas bypass pipe 74.

The three-way valves 70 and 72 are connected to the ECU 65 so that in the operation of recovering the catalytic activity, the ECU 65 controls the three-way valves 70 and 72 and the oxidizer gas humidifier 54 to increase the water content of the oxidizer gas to be supplied to the fuel cell 1. At the same time, the ECU 65 controls the three-way values 70 and 72 to flow the oxidizer gas to the oxidizer gas bypass pipe 74.

In the second embodiment, the water content of the oxidizer gas can be increased by the three-way valves 70 and 72 and the oxidizer gas humidifier 54, and thus the sulfur compounds adsorbed on the surfaces of the catalyst of the cathode catalyst layers 4 can be effectively removed. The other effects are the same as in the fuel cell system according to the first embodiment.

Third Embodiment

FIG. 6 is a flowchart showing the procedures for an operation of recovering catalytic activity in a fuel cell system according to a third embodiment. The constitution of the fuel cell system according to the third embodiment is the same as that of the fuel cell system according to the first or second embodiment, and thus the description thereof is omitted. The fuel cell system according to the third embodiment may be a combination of the fuel cell systems according to the first and second embodiments.

In the procedures for an operation of recovering catalytic activity in the fuel cell system according to the third embodiment, the treatments in Steps 200 to 205 are the same as in Steps 100 to 105 of the first embodiment shown in FIG. 4. In Step 202, the operation of recovering catalytic activity may be performed by combining at least two of the treatment of performing power generation of the fuel cell 1 at a predetermined load or more, the treatment of decreasing the temperature of the fuel cell 1 to increase the amount of water discharged from the catalyst layers, and the treatment of increasing the water content of the oxidizer gas to be supplied to the fuel cell.

In the third embodiment, when, in Step 205, power generation due to an increase in power generation load of the fuel cell 1 for the predetermined time t is finished, the ECU 65 controls the oxidizer gas supply regulating valve 49 to increase the flow rate of the oxidizer gas to be supplied to the fuel cell 1 to a predetermined value or more. This is performed for preventing so-called flooding in which surplus water is accumulated in the cathode catalyst layers 4 to decease the power generation performance of the fuel cell 1 in subsequent power generation because the fuel cell 1 performs power generation under a high-humidity condition in Step 202.

In the third embodiment, after the catalytic activity is recovered, the flow rate of the oxidizer gas is increased to a predetermined value or more, thereby removing surplus water accumulated in the cathode catalyst layers 4 and preventing a decrease in power generation performance due to flooding. The other effects are the same as in the fuel cell system according to the first embodiment or the second embodiment.

While the invention has been disclosed with reference to certain preferred embodiments, numerous modifications, alterations, and changes to the described embodiments are possible without departing from the sphere and scope of the invention, as defined in the appended claims and equivalents thereof. For example, the oxidizer gas flow rate sensor 52 and the oxidizer gas humidifier 54 shown in FIG. 3 need not be necessarily provided. Accordingly, it is intended that the invention not be limited to the described embodiments, but that it have the full scope defined by the language of the following claims.

The invention claimed is:

1. A fuel cell system comprising:
a fuel cell in which a plurality of unit cells, each having an electrolyte membrane held between electrode catalyst layers, are stacked;
an oxidizer gas humidifier for increasing the water content of an oxidizer gas to be supplied to the fuel cell; and
a control device for recovering catalytic activity of the electrode catalyst layers by controlling the oxidizer gas humidifier to increase the water content of the oxidizer gas to be supplied to the fuel cell, thereby increasing an amount of water discharged from the electrode catalyst layers to a predetermined amount or more.

2. The fuel cell system according to claim 1, wherein in recovering the catalytic activity of the electrode catalyst layers, the control device increases the amount of water discharged from the electrode layers to an amount greater than that in a normal operation of the fuel cell.

3. The fuel cell system according to claim 1, wherein in recovering the catalytic activity of the electrode catalyst layers, the control device allows the fuel cell to generate electric power with a predetermined load or more.

4. The fuel cell system according to claim 1, wherein in recovering the catalytic activity of the electrode catalyst layers, the control device decreases the temperature of the fuel cell.

5. The fuel cell system according to claim 1, wherein the control device performs the operation of recovering an catalytic activity in a high-load operation of the fuel cell.

6. The fuel cell system according to claim 1, further comprising:
a fuel cell condition detector for detecting the condition of the fuel cell; and
a recovery operation necessity deciding device for deciding whether or not an operation of recovering the catalytic activity is required on the basis of a detection signal of the fuel cell condition detector.

7. The fuel cell system according to claim 6, further comprising:
a sulfur compound detector for detecting the concentration of sulfur compounds contained in the oxidizer gas to be supplied to the fuel cell;
wherein the control device performs the operation of recovering the catalytic activity when the concentration of the sulfur compounds contained in the oxidizer gas is a predetermined value or more.

8. The fuel cell system according to claim 6, further comprising:
a sulfur compound cumulative supply detector for detecting the amount of sulfur compounds accumulated in the fuel cell;
wherein the control device performs the operation of recovering the catalytic activity when the cumulative amount of the sulfur compounds flowing into the fuel cell is a predetermined value or more.

9. The fuel cell system according to claim 8, further comprising:
an oxidizer gas flow rate detector for detecting the flow rate of the oxidizer gas;
wherein the sulfur compound cumulative supply detector calculates the cumulative amount of the sulfur compounds flowing into the fuel cell from the concentration of the sulfur compounds contained in the oxidizer gas detected by the sulfur compound detector, the flow rate of the oxidizer gas detected by the oxidizer gas flow rate detector, and the supply time of the sulfur compounds.

10. The fuel cell system according to claim 6, further comprising:
a unit cell voltage detector for detecting the voltage of each unit cell of the fuel cell;
wherein the control device performs the operation of recovering the catalytic activity when the voltage drop of each unit cell is a predetermined value or more.

11. The fuel cell system according to claim 6, further comprising:
a unit cell voltage drop rate detector for detecting the rate of voltage drop of each unit cell;
wherein the control device performs the operation of recovering the catalytic activity when the rate of voltage drop of each unit cell is a predetermined value or more.

12. The fuel cell system according to claim 6, further comprising:
a cumulative operation time detector for detecting the cumulative operation time of the fuel cell;
wherein the control device performs the operation of recovering the catalytic activity when the cumulative operation time of the fuel cell is a predetermined value or more.

13. The fuel cell system according to claim 1, further comprising:
a recovery operation possibility deciding device for deciding whether or not an operation of recovering the catalytic activity is possible;
wherein the control device performs the operation of recovering the catalytic activity after the recovery operation possibility deciding device decides that the operation of recovering the catalytic activity is possible.

14. The fuel cell system according to claim 1, further comprising:
an oxidizer gas flow rate controller for controlling the flow rate of the oxidizer gas to be supplied to the fuel cell;
wherein the control device increases the flow rate of the oxidizer gas to be supplied to the fuel cell to a predetermined value or more after an operation of recovering the catalytic activity.

15. The fuel cell system according to claim 1, wherein the control device is mounted on an automobile.

16. The fuel cell system according to claim 15, wherein the control device performs the operation of recovering an catalytic activity on the expressway.

17. A fuel cell system comprising:
a fuel cell in which a plurality of unit cells, each having an electrolyte membrane held between electrode catalyst layers, are stacked;
an oxidizer gas humidifying means for increasing the water content of an oxidizer gas to be supplied to the fuel cell; and
a control means for recovering catalytic activity of the electrode catalyst layers by controlling the oxidizer gas humidifier to increase the water content of the oxidizer gas to be supplied to the fuel cell, thereby increasing an amount of water discharged from the electrode catalyst layers to a predetermined amount or more.

18. A method for controlling a fuel cell in which a plurality of unit cells, each having an electrolyte membrane held between electrode catalyst layers, are stacked, the method comprising:
recovering catalytic activity of the electrode catalyst layers by increasing the water content of an oxidizer gas to be supplied to the fuel cell, thereby increasing an amount of water discharged from the electrode catalyst layers to a predetermined amount or more.

* * * * *